United States Patent [19]
Peterson et al.

[11] Patent Number: 6,102,091
[45] Date of Patent: *Aug. 15, 2000

[54] HOLLOW CORE PNEUMATIC WHEEL HAVING CONTOUR CONFORMING POLYURETHANE WALL

[75] Inventors: Tom Peterson; Neal Piper, both of Huntington Beach, Calif.

[73] Assignee: The Hyper Corporation, Santa Ana, Calif.

[ * ] Notice: This patent is subject to a terminal disclaimer.

[21] Appl. No.: 08/897,988

[22] Filed: Jul. 10, 1997

Related U.S. Application Data

[63] Continuation-in-part of application No. 08/680,728, Jul. 12, 1996, Pat. No. 5,908,519, which is a continuation-in-part of application No. 08/595,844, Feb. 2, 1996, Pat. No. 5,641,365, which is a continuation-in-part of application No. 08/354,374, Dec. 12, 1994, Pat. No. 5,630,891.

[51] Int. Cl.$^7$ .................................................... A63C 17/22
[52] U.S. Cl. .......................... 152/165; 152/327; 152/452; 152/453; 152/511; 301/5.3
[58] Field of Search ............................... 152/DIG. 8, 511, 152/512, 514, 515, 165, 327, 384, 452, 453, 166, 325, 320, 322, 501; 280/11.22, 11.23; 301/5.3

[56] References Cited

U.S. PATENT DOCUMENTS

| | | |
|---|---|---|
| 988,533 | 4/1911 | Zverina . |
| 2,052,130 | 8/1936 | Cassady .................................. 152/165 |
| 2,324,974 | 7/1943 | Greenup .................................. 152/511 |
| 2,570,349 | 10/1951 | Kardhordo . |
| 2,677,906 | 5/1954 | Reed . |
| 2,871,061 | 1/1959 | Behm et al. . |
| 3,121,430 | 2/1964 | O'Reilly . |
| 3,389,922 | 6/1968 | Eastin . |
| 3,469,576 | 9/1969 | Smith et al. . |
| 3,823,293 | 7/1974 | Gilliatt . |
| 3,877,710 | 4/1975 | Nyitrai . |
| 3,937,780 | 2/1976 | Mercier . |

(List continued on next page.)

FOREIGN PATENT DOCUMENTS

96/18513  6/1996  WIPO ............................ 152/DIG. 18

*Primary Examiner*—Geoffrey L. Knable
*Attorney, Agent, or Firm*—Fulwider Patton Lee & Utecht, LLP

[57] ABSTRACT

A urethane wheel including a hard urethane hub formed with a rim facing radially outward, and including stand-off ribs spaced equidistant thereabout. The stand-off ribs having centering notches opening radially outward. A thin wall polyurethane annular bladder with an interior annular stand-off skirt facing radially inward, contacting the centering notches of the stand-off ribs, and cooperating to position the bladder both radially and axially about the rim. The tire body is formed of soft polyurethane which surrounds the rim, encapsulates the bladder creating and integral cavity, and forms a contoured surface. A method of manufacturing the wheel which includes selecting a pressurized annular bladder, locating the bladder both axially and radially about the rim, forming a concentric bridge space having axial communication channels between the rim and bladder, and then pouring liquid urethane in a mold to form the tire.

15 Claims, 6 Drawing Sheets

U.S. PATENT DOCUMENTS

| | | | |
|---|---|---|---|
| 3,980,595 | 9/1976 | Schonfeld et al. | 152/452 |
| 4,040,670 | 8/1977 | Williams . | |
| 4,183,156 | 1/1980 | Rudy . | |
| 4,208,073 | 6/1980 | Hechinger . | |
| 4,219,945 | 9/1980 | Rudy . | |
| 4,305,212 | 12/1981 | Coomer . | |
| 4,361,969 | 12/1982 | Vermonet . | |
| 4,379,104 | 4/1983 | Koorevaar | 264/45.5 |
| 4,387,071 | 6/1983 | Kirkhuff | 264/279.1 |
| 4,445,283 | 5/1984 | Meyers . | |
| 4,909,523 | 3/1990 | Olson . | |
| 5,028,058 | 7/1991 | Olson . | |
| 5,046,267 | 9/1991 | Kilgore et al. . | |
| 5,048,848 | 9/1991 | Olson et al. . | |
| 5,129,709 | 7/1992 | Klamer . | |
| 5,158,767 | 10/1992 | Cohen et al. . | |
| 5,253,435 | 10/1993 | Auger et al. . | |
| 5,256,350 | 10/1993 | Frazini et al. . | |
| 5,257,470 | 11/1993 | Auger et al. . | |
| 5,297,349 | 3/1994 | Kilgore . | |
| 5,310,250 | 5/1994 | Gonsior . | |
| 5,312,844 | 5/1994 | Gonsior et al. . | |
| 5,320,418 | 6/1994 | Chen . | |
| 5,343,639 | 9/1994 | Kilgore et al. . | |
| 5,346,231 | 9/1994 | Ho . | |
| 5,351,710 | 10/1994 | Phillips . | |
| 5,353,459 | 10/1994 | Potter et al. . | |
| 5,353,523 | 10/1994 | Kilgore et al. . | |
| 5,362,075 | 11/1994 | Szendel . | |
| 5,401,037 | 3/1995 | O'Donnell et al. . | |
| 5,406,661 | 4/1995 | Pekar . | |
| 5,406,719 | 4/1995 | Potter et al. . | |
| 5,416,988 | 5/1995 | Potter et al. . | |
| 5,425,184 | 6/1995 | Lyden et al. . | |
| 5,441,286 | 8/1995 | Pozzobon . | |
| 5,468,140 | 11/1995 | Hoffman et al. . | |
| 5,560,685 | 10/1996 | DeBortoli . | |
| 5,567,019 | 10/1996 | Raza et al. . | |
| 5,630,891 | 5/1997 | Peterson et al. | 152/165 |
| 5,632,829 | 5/1997 | Peterson et al. | 152/165 |
| 5,733,015 | 3/1998 | Demarest et al. | 301/5.3 |
| 5,908,519 | 6/1999 | Piper et al. | 152/165 |

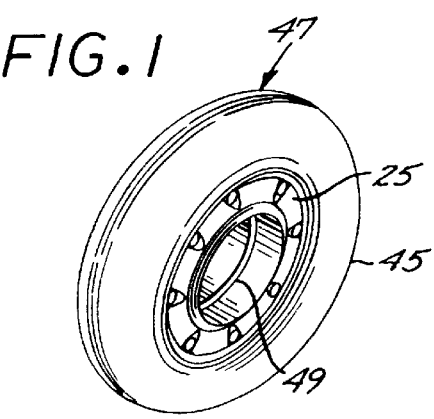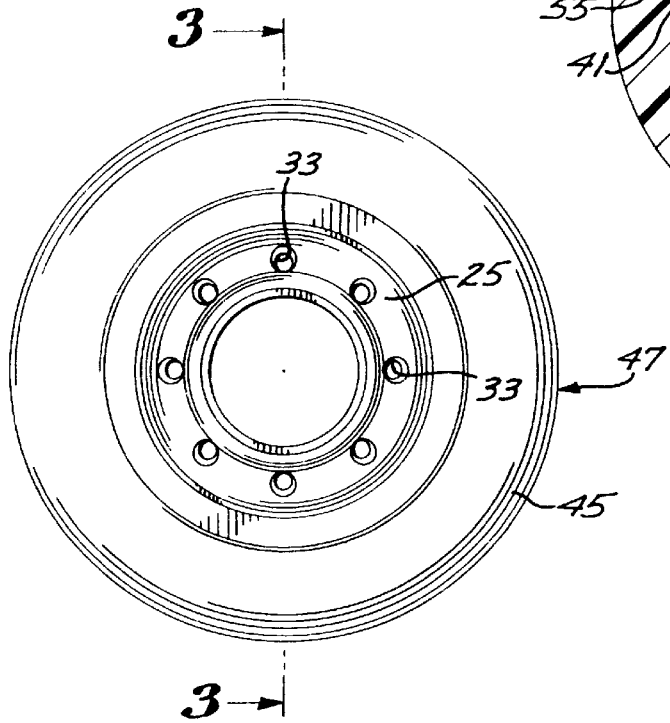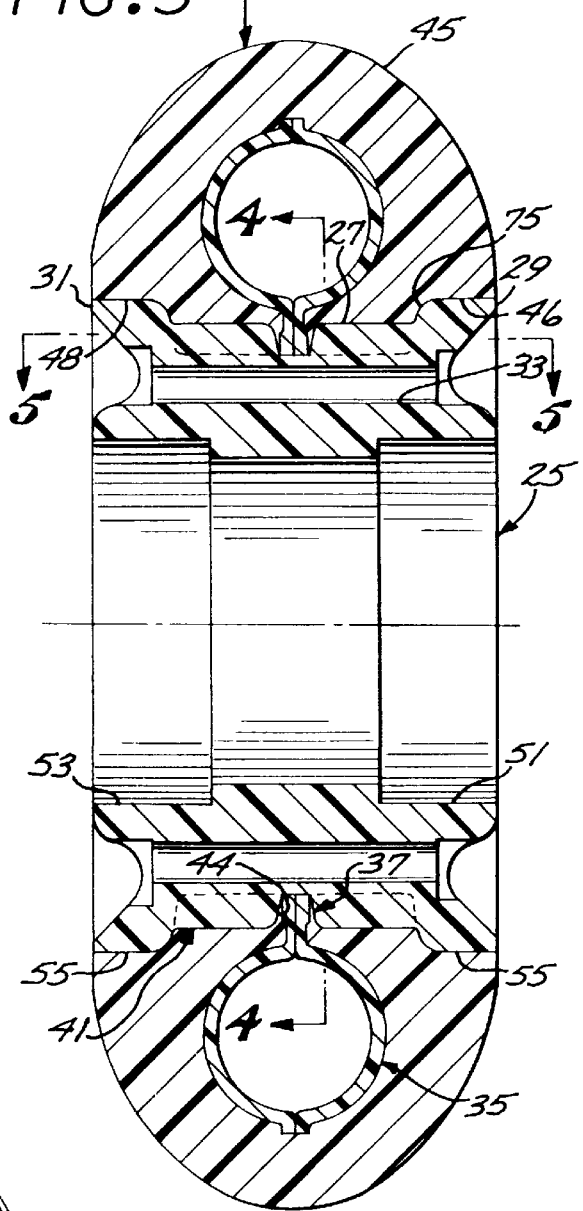

HOLLOW CORE PNEUMATIC WHEEL HAVING CONTOUR CONFORMING POLYURETHANE WALL

This application is a continuation-in-part of our U.S. application Ser. No. 08/680,728, filed Jul. 12, 1996, now U.S. Pat. No. 5,908,519, which was in turn, a continuation-in-part of our U.S. application Ser. No. 08/595,844, filed Feb. 2, 1996, now U.S. Pat. No. 5,641,365, which was in turn a continuation-in-part of our U.S. application Ser. No. 08/354,374, filed Dec. 12, 1994, now U.S. Pat. No. 5,630,891.

BACKGROUND OF THE INVENTION

1. Field of the Invention

This invention relates to in-line roller skate wheels and more particularly to a pre-pressurized pneumatic skate wheel of integral polyurethane construction having contour conforming tire support wall.

2. Description of the Prior Art

Roller skates and roller skate wheels have been known in the art. Typically, roller skates have incorporated four wheels in each skate. Early wheels were constructed of either wood or metal depending on the intended use. Wood wheels were most often used for indoor roller rink skating while metal wheels were used for outdoor skating. Inflatable roller skate wheels, such as that disclosed in U.S. Pat. No. 988,533 to Zverina, provided a simple, durable and economic roller skate wheel. Zverina includes an inflatable tube encased in a conventional tire.

In the past, many skate wheels were constructed of rubber. The availability of polyurethane in skate wheel construction has enhanced the enjoyment and popularity of outdoor skating. Typically roller skates have been constructed with four wheels in a box-like configuration. Such skates, while functional, do not allow for the freedom of movement experienced by ice skaters. It was thus proposed to mount the roller skate wheels in a line along the skate frame to achieve mobility which closely mimicked the movement of an ice skate. Since that time, "in-line roller skates" have become one of the most popular recreational and physical fitness activities in the United States, and elsewhere. In-line skating has also developed into a highly sophisticated and technologically advancing commercial market.

The recreational skater often travels a variety of terrains ranging from concrete and wood to more bumpy and uneven surfaces such as asphalt which may exhibit bumps, pits and even wide cracks with vegetation growing therein. The main concern experienced by the recreational skater is to obtain a comfortable ride while skating socially, participating in physical fitness or even just a way to reach a destination. This skater requires a resilient wheel which is light weight and shock resistant. More experienced skaters, such as competitive skaters, employ in-line skates for sporting purposes such as hockey or road racing. Dancers typically prefer relatively hard tire bodies since some slippage is an acceptable compromise for the performance required. On the other hand, a hockey player would prefer a softer tire having excellent surface gripping characteristics. In the past, these various performance characteristics have been attained only by expensive painstaking manufacturing processes.

Polyurethane in-line skate wheels proposed in the past have typically been constructed by injection molding to form a hub surrounded by a tire body of solid urethane. It is desirable that such wheels provide a durable and relatively smooth ride over many types of terrains. Solid polyurethane bodies have been proposed. Such tire bodies are necessarily restricted in that the performance characteristics cannot be easily and inexpensively adjusted during the manufacturing process to accommodate the many different support surfaces and loads emanated by a skate employed in a demanding sport such as, for instance, hockey. Unlike a traditional quad or box-style roller skate, in-line skates are designed to withstand a variety of different side loads due to the inclination of the skate along its horizontal axis when turning, as well as high intensity shock loads from quick stops, bumps and other road hazards. Thus the designers of in-line skate wheels have an intensely difficult task when faced with such diverse performance requirements.

It has been proposed to construct an in-line skate wheel with a nylon hub having an annular gridwork defining axially through passages for receiving cross segments of urethane embodied in a tire body. A wheel of this type is shown in U.S. Pat. No. 5,028,058 to Olson. Wheels of this type, while satisfactory for their intended purposes, do not typically exhibit the durability and performance characteristics important to aggressive athletic roller skating activities, such as roller hockey and the like.

Other efforts to improve polyurethane wheels have led to the proposal that polyurethane be injected into a mold around a hard polyurethane hub having an annular grid work for interlocking of the resultant tire body with the hub to create a solid tire body. A device of this type is shown in U.S. Pat. No. 5,312,844 to Gonsior. Wheels of this type, while being acceptable for recreational skating activity, are relatively expensive to manufacture do not provide a tire periphery which will readily conform to irregular underlying surfaces or satisfactorily grip the underlying surface on sharp fast turns and the like.

Other efforts in polyurethane wheel design has led to the proposal of a hard polyurethane hub formed with a radially projecting annular ring configured with transverse through bores for flow of a liquid thermoplastic polyurethane tire material therethrough for mechanical interlocking thereof. A wheel of this type is shown in U.S. Pat. No. 5,567,019 to Raza. Wheels of this type, while satisfactory for recreational skating, are relatively expensive to manufacture and exhibit a relatively hard peripheral surface which provides for only limited cushioning and flexibility to accommodate irregular terrain and flexure to exhibit a relatively large foot print upon tight high speed turns for positive gripping of the underlying terrain.

In recognition of the desirability of an in-line skate wheel which combines the resiliency and performance of a polyurethane wheel with the enhanced grip, durability and shock absorption properties associated with hollow body wheel construction and which can be casted from thermoplastic polyurethane, applicants propose a solution in U.S. Pat. No. 5,630,891, assigned to the assignee of the instant application. That patent discloses an in-line skate wheel with an adjustable bladder encapsulated in a thermoplastic polyurethane wheel body. Pressure in the bladder is adjustable through the use of a valve system. Such a wheel allows the skater to adjust wheel performance to match his or her needs for the particular skating maneuver to be undertaken. Since the skater has multiple performance options available without purchasing multiple wheels and without having to manually change the skate wheels, such a wheel is versatile, cost effective and convenient. While having important commercial applications, it is recognized that such an adjustable pneumatic in-line skate wheel requires the skater to manipulate the wheel each time skate conditions change and the wheel itself is relatively costly to manufacture.

Another form of in-line skate wheel with similar urethane and pneumatic benefits can be found in our U.S. patent application Ser. No. 08/595,844 filed Feb. 2, 1996 now U.S. Pat. No 5,641,365, also assigned to the assignee of the instant application. In that application, we show a pre-pressurized pneumatic in-line skate wheel of integral construction and consisting of an annular bladder and a plurality of radially projecting bladder rods encapsulated in a thermoplastic polyurethane body. Such an invention is relatively cost effective to manufacture but employs a relatively elaborate bladder and valve construction.

In other areas of the art, such as in the construction of variable pressure athletic shoes, it has been known to provide elastomeric bladders configured with multiple discrete chamber or open cell elastomeric foam having inlet and outlet valves. Devices of this type are shown in U.S. Pat. Nos. 4,183,156 and 4,287,250 to Rudy and U.S. Pat. No. 5,144,708 to Pekar. However, such bladders have not been generally adapted to or employed in skate wheel construction.

Thus, there exists a need for a skate wheel which can be inexpensively casted from thermoset polyurethane by a method which allows for convenience adjustment of the tire body to exhibit different operating characteristics without the necessity of making entirely new molds or involving an expensive development procedure to develop new or different thermoplastic urethane. It has been discovered that soft polyurethane exhibits desirable characteristics for in-line skate wheels in that the outer peripheral tread surface tends to flex and compress in response to forces associated with rolling contact under load involving irregular support surfaces. However, solid thermoplastic polyurethane tire bodies suffer the shortcoming that they consume a substantial quantity of polyurethane and that the force absorption characteristics are not ideal. The performance factors with which an in-line skater is concerned for when skating over concrete, asphalt or a composition, are speed, grip, durability and shock absorption. While all four factors are important for active sports such as hockey, grip is critical to preventing slippage and minimizing abrasion and wear.

As can be seen, there remains a need for an in-line skate wheel which combines the benefits of the shock absorptive properties found in pneumatics with the resiliency of polyurethane, but in a manner that is easier and more cost effective to manufacture.

SUMMARY OF THE INVENTION

The invention is a pre-pressurized pneumatic in-line skate wheel with conforming contoured support surface to enhance gripping and reduce abrasion and which will also allow the skater to experience a resilient yet comparatively smooth ride. The present invention allows for more cost effective manufacturing process and thereby a cost effective alternative wheel that functions well on a variety of surfaces, and under a variety of conditions. Furthermore, the wheel construction is such that the bladder will be further inflated to a higher pressure during the manufacturing process thereby cooperating with the hub to provide for proper bladder placement within the body of the tire and a more uniform bladder surface, and therefore a more even load bearing wheel.

The wheel includes a hard urethane hub formed with a pair of axially spaced retainer flanges which are configured to form a drop center. A low pressure annular bladder device surrounds the hub drop center to act as an annular cavity envelope during the manufacturing process. The hub drop center and poured polyurethane tire serve to generally encapsulate the bladder envelope and provide the load bearing and force cushioning structure.

The bladder may be formed with a stand-off skirt to maintain radial spacing about the drop center and may be inflated to assume a firm envelope defining a mandril about which the tire body is formed to thus cooperate in creating a tire which is relatively lightweight and affords consistent performance. The pre-pressurized bladder cooperates to encapsulate a small volume of pressurization gas which will respond to the heat generated by the exothermic reaction of the curing polyurethane in the tire to form an accurately located cavity about which a symmetrical thick wall of polyurethane is formed encapsulating such cavity to cooperate in carrying the wheel load and cushion against shock forces.

In one embodiment the annular bladder incorporates a radially inner annular stand-off skirt which contacts the hub drop center to cooperate in positively establishing the position of the body of the bladder within the mold during the manufacturing process.

Another embodiment of the present invention incorporates a hub having a rim surface facing radially outwardly with a plurality of equally spaced stand-off ribs. Each stand-off is configured with a centering notch, opening radially outwardly, for receipt of the radially inner edge of the bladder stand-off skirt and cooperates to locate the bladder within the mold during the manufacturing process.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of a pneumatic in-line skate wheel embodying the present invention;

FIG. 2 is a side view, in enlarged scale, of the wheel shown in FIG. 1;

FIG. 3 is an enlarged cross-sectional view taken along line 3—3 of FIG. 2;

DETAILED DESCRIPTION OF A PREFERRED EMBODIMENT

Figure 6:
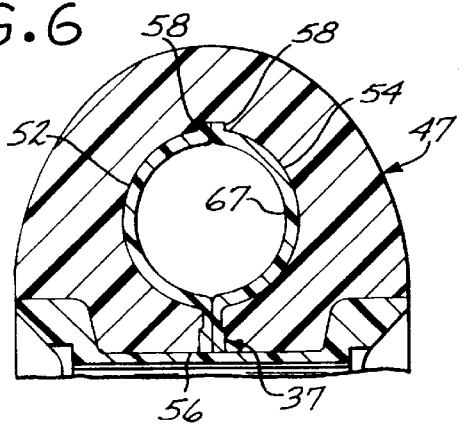
FIG. 6 is an enlarged cross-sectional view taken along line 6—6 of FIG. 3.
Figure 8:
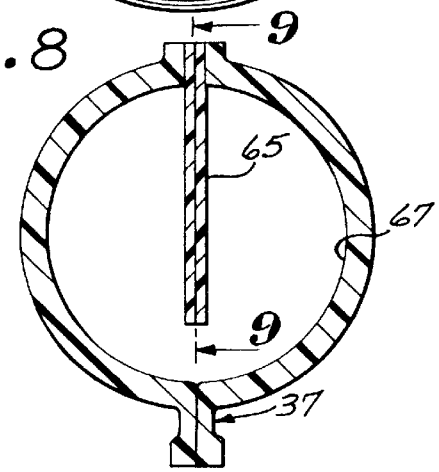
FIG. 8 is an enlarged cross-sectional view taken along line 8—8 of FIG. 7.
Figure 9:
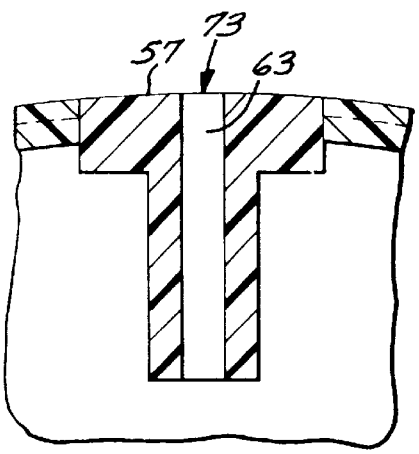
FIG. 9 is an enlarged cross-sectional view taken along line 9—9 of FIG. 8.

Referring to FIGS. 1 and 3, the hollow in-line roller skate wheel with conforming contoured support of the present invention includes, generally, a hard polyurethane hub 25 which may be formed with a drop center 27 having a pair of radial flanges 29 and 31. Conveniently, the flanges are formed with through axial curing bores 33 spaced equidistant around the opening in the hub. A thin wall bladder device 35 is constructed of co-extensive donut shaped urethane sheets fused by radio frequency (R.F.) energy about the radially interior and exterior peripheries to form a body defining an annular cavity 67 and leaving a double layer, radially inwardly projecting, stand-off skirt, generally designated 37 (FIGS. 3 and 6). The drop center may be formed with radial stand-off ribs 39 and 41 disposed in annular relation therearound. Alternate ones of these stand-off ribs may be formed at the radial outer apexes thereof with axial fins 43 projecting radially outwardly and formed centrally with radially outwardly opening axially centered slots 44 into which the stand-off skirt 37 of the bladder device 35 is nested. A relatively soft, but load bearing polyurethane tire body 45, is formed around and generally encapsulates the bladder device 35 and is bonded thereto and to the surface of the drop center 27. The tire is configured with a thick wall defining a generally arch shape in transverse cross-section terminating at the opposite flat radially inner edges defining beads 46 and 48 and further defining a generally oval shaped, outwardly facing peripheral tread surface 47.

In-line skaters, recreational, advanced and even professionals, put great demands and stress on the design and construction of the in-line roller skate wheel. Even during recreational outings, the change in surfaces from rough to smooth and from irregular to even surfaces puts tremendous stresses or the skater as well as the skate wheels themselves. Further, sharp turns, quick stops and other such maneuvers subject the wheels to substantial shock loads and lateral torque loads to all sides of the tire body. When a skater is traveling at high speeds, the wheels are further subjected to vibrational stresses on top of the stress due to maneuvers and changing terrain. Therefore, it is critical that the in-line skate wheel be constructed to absorb shock in the tire body thereby reducing stress on the skater, plus create a resilient and reliable wheel. For many athletic events, such as in-line roller hockey, it is important that the tire form a flat tangential footprint of limited area at the contact plane with the support surface to thus enhance gripping to such support surface and thereby reduce abrasion which might otherwise result from slippage due to high centrifugal forces applied during sharp turns and quick maneuvers. In the present invention this is accomplished in a more cost efficient manner.

In the preferred embodiment the wheel is constructed of a hard polyurethane hub 25, with the annular bladder 35 and tire 45 constructed of relatively soft thermoset polyurethane. The hub 25 is constructed with a central axial bore, generally designated 49, having at its opposite ends enlarged-in-diameter to form oppositely opening, cylindrical bearing glands 51 and 53 configured to receive roller bearing assemblies. The hub is formed on the axially opposite sides of the drop center with the axially spaced apart radially projecting flanges 29 and 31 defining respective radially outwardly facing bead seats 55 (FIG. 3) onto which the respective annular tire wall edges 46 and 48 seat and which cooperate in carrying load forces applied to the wheel, hub and axial system. Formed about the drop center 27, in one embodiment, are somewhat saw tooth angular stand-off ribs 39 (FIG. 4) defining spokes radiating outwardly from such drop center and which assist in centering the bladder and enhance bonding of the hub and bladder assembly to the tire by providing axial flow paths therebetween for the tire polyurethane to afford increased surface area between the hub and tire for positive bonding during the molding process. Alternate ones of the stand-off ribs 39 are further formed at their radially distal apexes with the radially outwardly projecting fins 43 configured with the radially outwardly opening centering slots 44.

It will be appreciated that the hub is integrally formed of a single piece of hard polyurethane, typically with a durometer index of 70D, to provide the necessary support to ensure high degree of bonding strength during the tire molding process. A preferred embodiment of the present invention utilizes a 30% fiberglass filled thermoplastic polyurethane (TPU) available from BF Goodrich, Product No. 59300. The urethane materials forming the hub and tire will form a bond during the molding process to form an integral unit having exceptional durability.

In practice, the major diameter for the bead seats 55 of the hub 25 is about 3.9 cm, the major diameter of the ribs 39 about 33 cm, the major diameter for the respective fins 43 about 3.6 cm, the axial width of the hub is 2.4 cm, the axial width between the bead seats is 1.5 cm and the axial width of the bead seats 55 is 0.4 cm.

Figure 7:
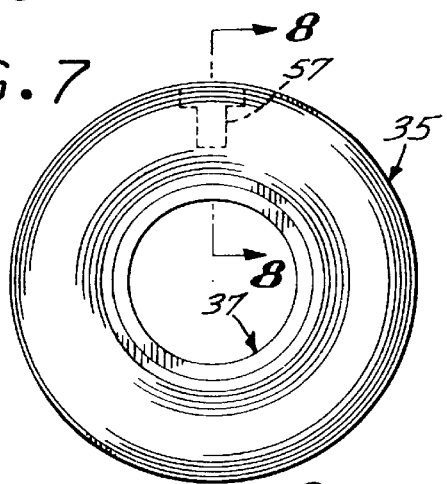
FIG. 7 is a side view, in reduced scale, of a pre-pressurized bladder device included in the wheel shown in FIG. 1.

Referring to FIG. 7, the bladder 35 is constructed of soft urethane ring shaped sheets 52 and 54 preferably of J.P. Stevens No. 1450 urethane of between 0.005 and 0.100 inches thick, preferably of 0.020 inches thick. The ring shaped sheets are welded together by heat sealing along their respective radially inner and outer marginal flanges 56 and 58 with the combined double layer of such inner flanges 56 serving to provide sufficient radial column strength to maintain the body of such bladder spaced radially from the drop center during the molding process as described hereafter. The durometer index of the bladder is approximately 80A. It is of benefit that the welded seams defined by the fused annular flanges 56 and 58 serve to establish essentially non-distendable inner and outer rings which fix the radially inner and outer dimensions of the bladder, irrespective of the increased pressure generated in the cavity of the body due to the elevated temperature acting on the air in such bladder during the exothermic reaction initiated by the introduction of the high temperature polyurethane for the tire body.

For the bladder 35, the outside diameter may be about 6.3 cm, the inside diameter of the skirt 37 about 2.8 cm, the outside diameter of such skirt about 3.2 cm and the outside diameter of the distended cross section of such bladder about 1.0 cm.

Formed in such bladder 35 is an one way check or "duck bill" valve generally designated 57. The duck bill valve 57 is used to provide one way gas or liquid flow into the bladder. The duck bill valve is constructed such that it extends radially into the annular bladder in a generally T-shape.

While the valve 57 may take many different forms, for the purpose of explanation, such valve is shown extending within the inflatable bladder 35 through the peripheral seal 73. Such valve may be constructed of two layers of heat sealable plastic film sealed along the side edges, so as to define a central channel 63. The central channel provides for the fluid flow from a pump external to the bladder. The valve may be of an outer layer of polyurethane ranging in thickness of 0.002 to 0.020 cm, and an inner layer of 0.0004 to 0.0006 cm thick polyurethane. The channel is not sealed but remains "open" along the perimeter. The unsealed area maintains the pressure with the bladder by the addition of a barrier coating to the inner surfaces of the valve. The barrier material may be of sufficient area and thickness to prevent heat or R.F. sealing of the valve when the bladder is being sealed. A barrier coating may be applied using printing techniques or through liquid dispersion techniques to adhere to the polyurethane to thereby prevent heat sealing of the two films.

In practice, the bladder is inflated by insertion of a pump device, typically using a needle, into the valve 57, through the channel 63. Pressurized fluid, such as air, is pumped into the bladder, through the valve, to partially inflate such bladder, thereby creating a soft, slightly distended ring shape. The bladder may then be placed over one flange 29 and nested in the drop center 27 ready for application of the tire body.

As noted, the annular bladder 35 is generally inflated with selected ones of various gases, liquids or mixtures thereof. The variation in gas pressure in the chamber 67 (FIG. 7) can be utilized to effectively control the resultant cross-sectional size and configuration of the bladder following the molding process. The exothermic reaction which occurs in the molding process typically generates heat at about 250° F. which may be employed to heat positive coefficient of expansion gas so as to elevate the pressure thereof to cause the bladder to assume a circular in cross-section shape. Utilizing the reaction governed by the Ideal Gas Law (PV=nRT), the relationship of volume and pressure can be utilized to control expansion of the annular bladder 35 during the exothermically driven temperature increase. Therefore, by utilizing various ones of positive coefficient of expansion gases such as Carbon Dioxide, Helium, Neon, CFC based gasses or ambient air, relatively great pressure increases in the annular bladder can be easily generated.

It will be appreciated that for higher pressures in the bladder, the degree to which the gas tends to permeate the bladder and tire walls becomes critical. Consequently, for application where higher pressures are required to afford the desired operating characteristics, gasses with higher atomic numbers will be selected for their lower permeability characteristics. Many of those characteristics are described in U.S. Pat. No. 4,183,156 to Rudy so will not be set forth herewith in detail.

Figure 4:
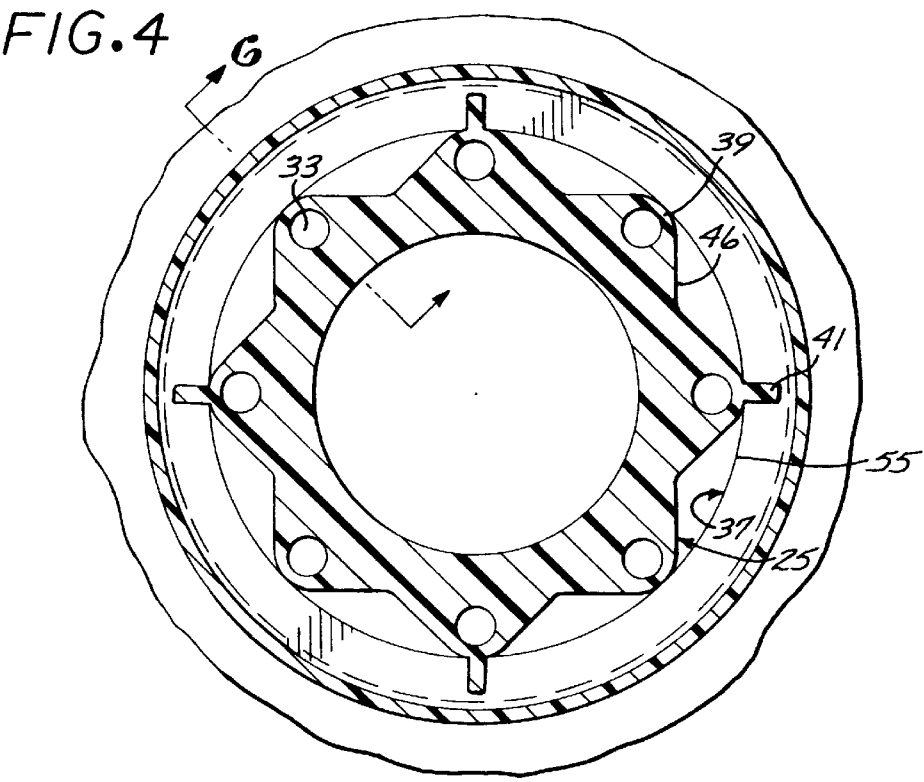
FIG. 4 is cross-sectional view, in enlarged scale, of hub and bladder device incorporated in the skate wheel taken along line 4—4 of FIG. 2.
Figure 5:
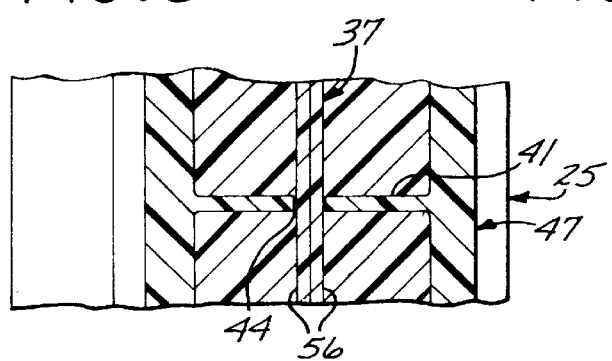
FIG. 5 is an enlarged cross-sectional view taken along line 5—5 of FIG. 3.

During the manufacturing process, the annular bladder 35 is typically prepressurized at ambient temperature, generally about 75° F. In the exemplary embodiment, the annular bladder is pressurized to a relatively low pressure, such as 10 psi. As can be seen in FIGS. 2 and 4, the pre-pressurized annular bladder 35 is then drawn over one of the flanges 29 and 31 and nested in the drop center 27. The stand-off skirt 37 is nested in the slot 44 formed in the respective fins 43 for precision and support.

Figure 13:
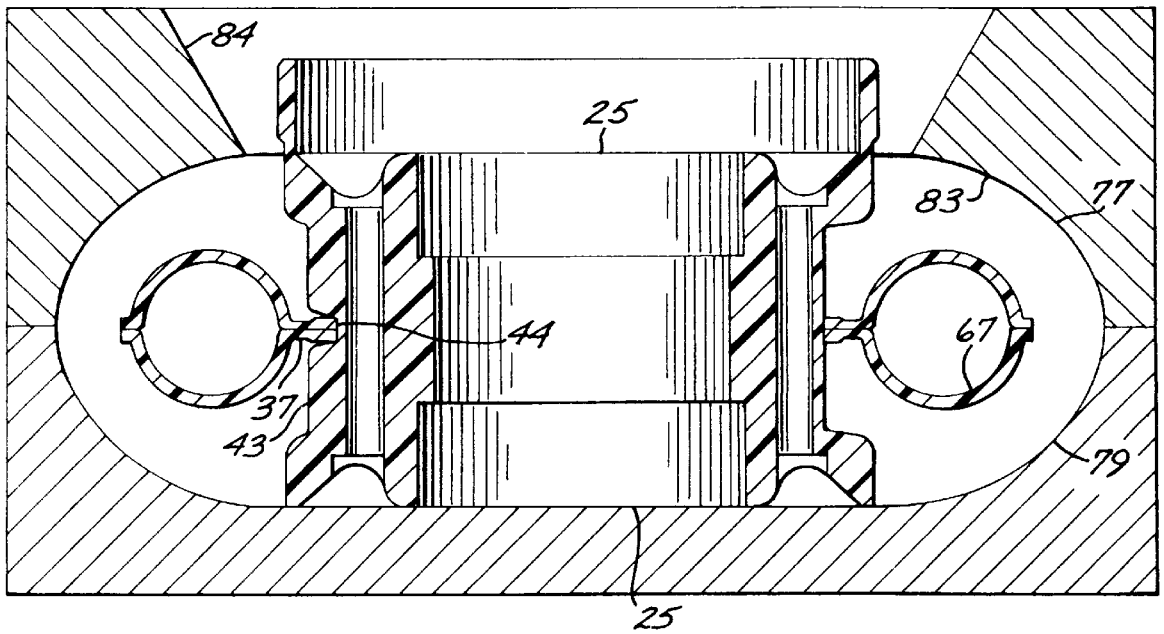
FIG. 13 is a cross-sectional view, in enlarged scale, of the hub and bladder device included in the wheel shown in FIG. 1 as nested in a mold.

It is a characteristic of the wheel of the present invention in that it can be manufactured by open cast mold construction (FIGS. 13 and 14) employing a mold having upper and lower halves. The mold halves are formed with complementary toroidal cavities 77 and 79 which may be placed together in a horizontal orientation with the upper half incorporating a funnel shaped gate 84. The hub 25 with the partially inflated bladder 35 mounted in the drop center may then be placed in position in the lower half of the mold and the upper half thereof closed thereon (FIG. 13). It will be appreciated that in practice, the weight of the body of the body of the bladder itself distended from the spacer skirt 37 may then weight the radially distal portion of such body slightly downwardly toward the bottom of the cavity in the lower mold half. Moreover, there may also be a tendency for the liquid polyurethane being poured into the body of the tire 45 to weight the body of such bladder downwardly in the mold cavity. This weighting of the bladder is then somewhat counteracted when the liquid polyurethane for the tire body is poured into the lower mold cavity 79 thus tending to buoy the inflated tube body upwardly. To compensate these factors, in practice, the centering notches 44 in the fins 43, may be spaced from the axial center of the drop center toward what would be the top side of the hub during the molding process such that, when the body of such bladder is weighted downwardly under its own weight and buoyed upwardly as described in the normal molding process, the body thereof will be centrally located and generally concentric with respect to the parabolically shaped tread surface of the tire when the molding process is completed.

Figure 14:
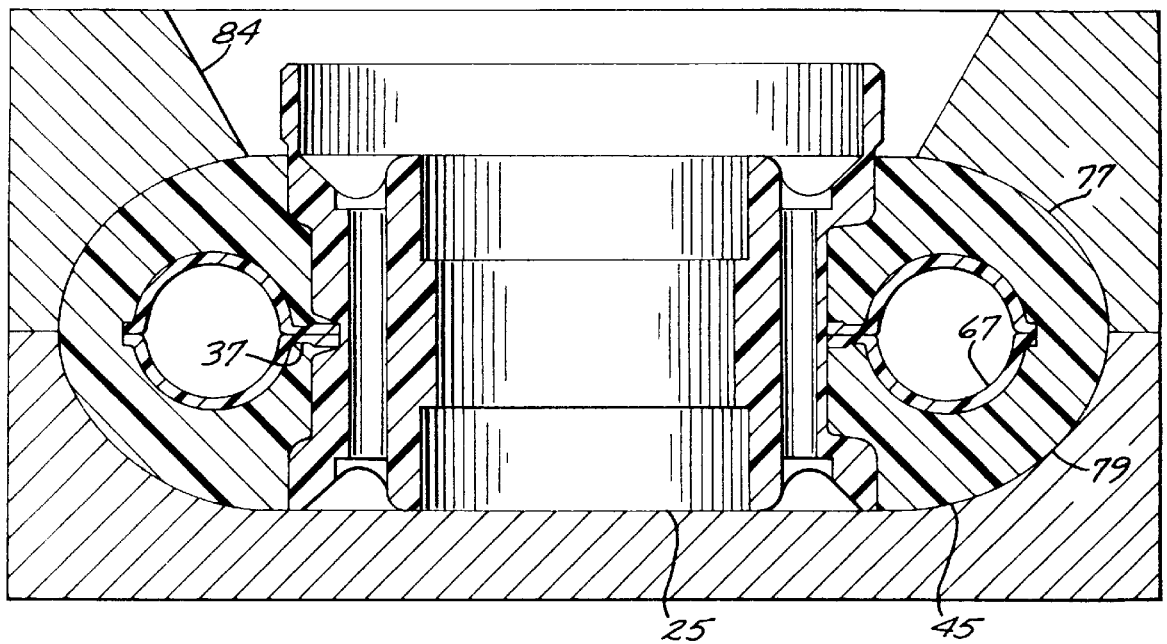
FIG. 14 is a cross-sectional view, similar to FIG. 13, but showing the tire body molded on the hub.

In any event, it will be appreciated that the liquid polyurethane for the body of the tire 45 will typically be poured into the mold gate 84 at a temperature of about 180° F. The liquid polyurethane will flow about the cavity of the mold 83 and around the body of the partially is inflated bladder 35 and around both sides of the stand-off skirt 37, through the axial passages 46 defined between the respective spacer ribs 39 to thereby form a relatively complete encapsulation of the bladder 35, including the formation of support bridges in the axial spacing 46 between the respective ribs (FIGS. 4 and 14). In this manner, the high integrity bond will be formed with the surface of the bladder 35 thus essentially forming such bladder integral with the body of the tire and also bonding with the surface of the drop center 27, including the undulating surfaces of the ribs 39 and the interface between the radially inwardly facing edges 46 and 48 of the opposite side walls of the tire as seated on radially outwardly facing seats 55 of the respective radial flanges 29 and 31 such that a relatively complete encapsulation of the cavity defined by the bladder 35 and complete bonding is achieved. The exothermic reaction of the liquid polyurethane will serve to raise the temperature thus raising the temperature of the volume of air within the envelope defined by the bladder 35. As described above, for the relatively small volume of air trapped in the bladder 35 under the pre-pressurized pressure of 10 psi, this exothermic reaction for the volume of polyurethane captured in the mold cavity will raise the temperature of the entrapped air from about 75° F. to about 250° F. This then serves to expand the air in such bladder to fully distend the walls of such bladder under the dictates of the Ideal Gas Law (PV=nRT) causing axially opposite side walls of such bladder to be fully distended to force the axial cross section of such bladder to assume a circular configuration as depicted in FIGS. 3 and 14. During this process, it will be appreciated that the RF welded seams defined by the joinder of the radially internal and external flanges 56 and 58 (FIG. 6) will serve to limit the radially interior and radially exterior limits of the walls of the bladder from distention beyond their pre-established configuration, thereby positively establishing the maximum interior and exterior diameter of the resultant envelope defined by the bladder and limiting the distension of the walls thereof under these conditions to the axial direction. The pressure of such bladder will thus be momentarily raised several psi to positively maintain the bladder walls properly distended to a circular cross section as depicted in FIG. 6 thus establishing a hollow cavity 67 which is centrally located and concentric with the configuration of the mold cavity (FIG. 13) itself and the consequent tire body to be formed therein.

The bladder thus serves as somewhat of a mandril to form a hollow cavity in the casted tire body. In this regard, it will be appreciated that the radial column strength of the coextensive annular flanges 56 defining the stand-off skirt 37 will tend to maintain the body of the bladder itself spaced radially to assume a concentric configuration about the drop center of the hub 25 to thereby cooperate in establishing the desired positioning of the body of such bladder. Also, the radial extent of the apexes of the respective ribs 39 (FIG. 4) will cooperate to positively space such skirt radially outwardly and maintain the open axially through passages 46 to thus allow for relatively free communication therethrough of the liquid polyurethane to form axial struts extending from one axial side to the other under the body of the bladder to cooperate in establishing nearly total encapsulation of the bladder. As will be appreciated to those skilled in the art, the bladder 35 may be maintained in spaced relationship relative to the drop center to facilitate encapsulation thereof by either the ribs 39 without the skirt 37 or by the skirt without such ribs or by the use of any other acceptable radial spacer.

It will be appreciated by those skilled in the art that the increased pressure in the bladder slightly distending the walls thereof serves to increase the volume of the cavity 67. Then as the polyurethane cures and cools over time, thus cooling the air within such chamber, there will be a slight decrease in pressure of 2–3 psi below the initial pre-pressure of about 10 psi. However, because of the relatively thick peripheral wall 47 of the body of the tire 45 and its arch shaped cross-sectional configuration, allowing it to set firmly on the respective radially outwardly facing bead seats 55 and the positive bonding to the drop center and hub, the slight decrease in pressure will not detrimentally affect the ultimate performance of the tire itself. With the relatively low pressure in the chamber 67 forming the annular cavity in the tire body, permeation of air out of the wall of the bladder 35 under normal operating conditions does not typically have serious detrimental affect on the performance of the tire, particularly given the fact that the cavity 67 is fully encapsulated by the tire body in cooperation with the drop center of the hub to thus cooperate in resisting such permeation.

Referring to FIG. 3, it will be appreciated that wheels made in accordance with the present invention may be mounted in the frame of an in-line skate utilizing roller bearing assemblies mounted on axles and received in the respective bearing glands 51 and 53. Then, when a skater wearing the skates undertakes rapid and intricate maneuvers, such as in a hockey contest, the wheels will be loaded with relatively high forces as dictated by the number of wheels mounted under a single skate and the speed at which the skates are operated and the tightness of the turns undertaken. It is important that the polyurethane body of the tire 45 is relatively soft compared to the hub, thus allowing the tread surface 47 making contact with the underlying support surface to flatten slightly thus forming a secure footprint which will cooperate in establishing high friction contact with the underlying support surface to thereby resist any tendency of the wheel to skid radially outwardly due to the centrifugal forces applied thereto during a tight turn. It will be appreciated that the reaction forces so applied to the bottom surface of the tread will act thereon to resist lateral skidding during turns at high speeds.

With continued reference to FIG. 3, for the purpose of illustration, assuming the load on the tire is acted downwardly on the hub 25 to thus load the respective bead seats 55 and drop center of the hub, the forces so applied will act, in one path, radially downwardly on the opposite sides of the arch shaped tire wall to the footprint formed by the contact point of the tire with the support surface. Then, as the tire rolls along such support surface and encounters any irregularities, undulations or small obstacles, such as pebbles or gravel stones, the force of impact therewith will tend to slightly flex the wall of such tire radially inwardly toward the toric center of the bladder 35, which radial inward flexure will be resisted by the configuration of the relatively thick wall of such tire as incorporated in the inherently strong arch shaped structure as supported on and bonded to the bead surfaces 55 and drop center of the hub. In this manner, the performance of the wheel is relatively independent of the actual pressure in the bladder but, rather, relies on the load carrying structure afforded by the thick wall tire body and its arch shaped configuration as depicted in cross-section shown in FIG. 3. Thus, the tire itself is durable and can withstand high variation in loads and rigorous maneuvers which will serve to transfer, particularly for heavier skaters on the order of 180 to 245 pounds, the significant forces and stresses to the hub entire structure. Moreover, the relatively soft and somewhat flexible polyurethane tire body will allow for limited flexure upon contact with small obstacles and the characteristic of slight flattening at the contact surface, will provide a high friction gripping effect which will tend to resist any skidding and consequent abrasion of the tire surface and will tend to flex and accommodate abrupt changes in surface configuration.

Figure 10:
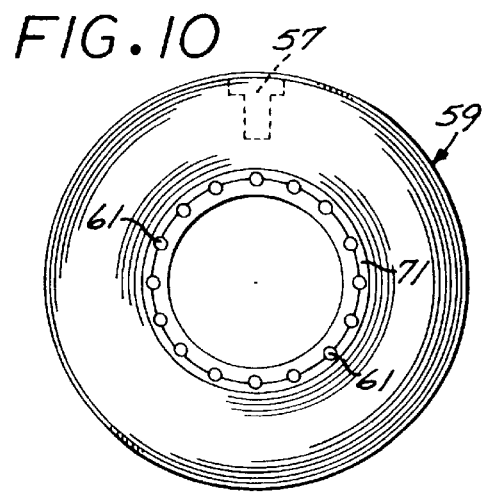
FIG. 10 is a side view of a bladder device which may be incorporated in a second embodiment of the present invention.
Figure 11:
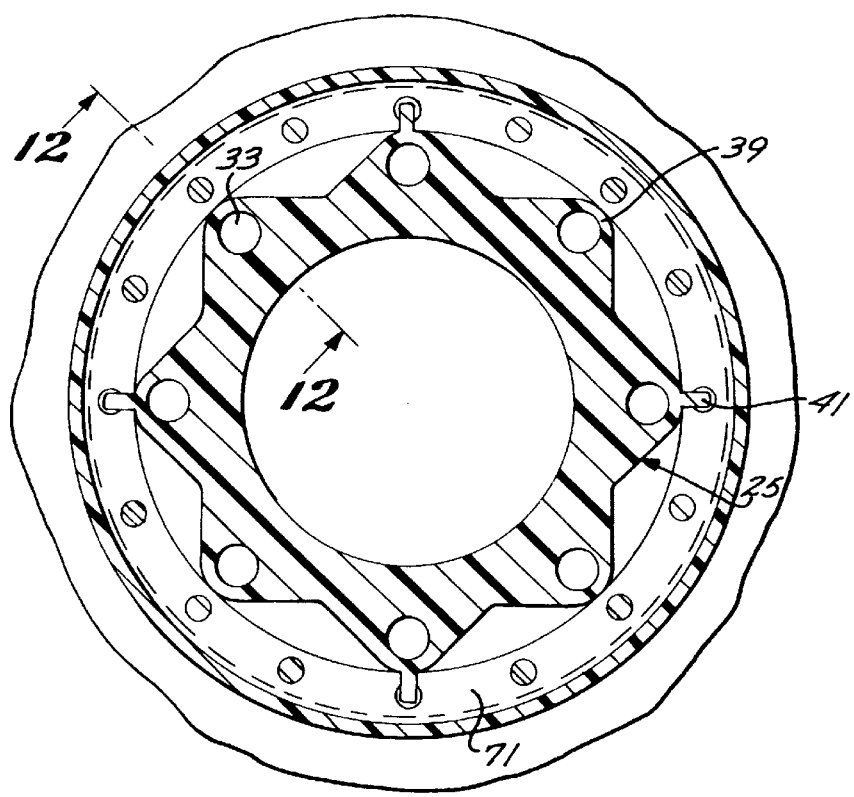
FIG. 11 is an enlarged cross-sectional view of the bladder device shown in FIG. 10, incorporated a second embodiment of the wheel of the present invention in the skate wheel shown in FIG. 1.
Figure 12:
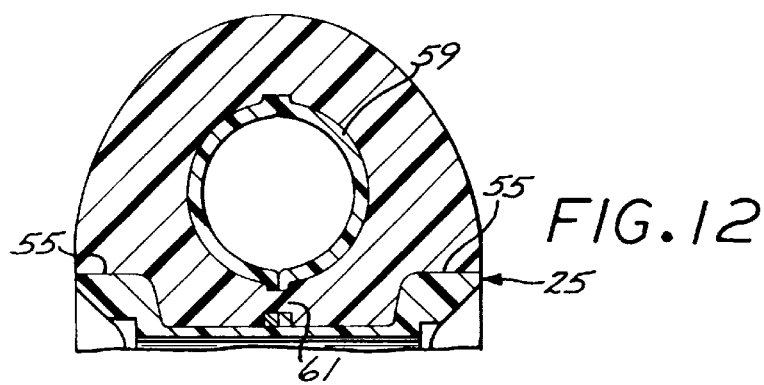
FIG. 12 is a sectional view taken along line 12—12 of FIG. 11.

Referring to the embodiment shown in FIGS. 10–12, construction thereof is similar to that described hereinabove, except that the wheel incorporates a bladder, generally designated 59, configured with an interior stand off skirt, generally designated 71, which incorporates a plurality of axially extended through communication bores 61 about 0.2 cm in diameter located in a circular array thereabout for convenient escape therethrough of any trapped air during the molding process to thereby assure full encapsulation without formation of any unwanted air bubbles.

Referring to the embodiment shown in FIGS. 15–19, construction thereof is similar to that described hereinabove, except that the wheel incorporates a hub, generally designated 85, having a thin, 1 cm thick cylindrical peripheral wall 90 configured with a radially outwardly facing surface 91 disposed on a 4 cm diameter having a plurality of radial stand-off ribs in the form of staggered lugs, generally designated 87. In this embodiment the respective stand-off ribs are configured with, when viewed in axial cross section, a triangular shape to define respective axially outwardly facing, radially outwardly and axially inwardly angling expander ramps 99, flat radially distal axial cam surfaces 105 disposed on a 5 cm diameter and axially and radially inwardly inclined centering ramps 101. The centering ramps angle radially inwardly at an angle of about 27° to the axis and the expander surfaces angle axially and radially inwardly at about 39° to the axis to thereby cooperate so that the lotus of the respective surfaces, as rotated through a revolution about the central axis, form an axially inwardly and radially outwardly angled expander cone and an axially and radially inwardly angle centering cone. The centering ramp of the staggered lugs project axially beyond the axial central plane of the hub and are formed at such center plane with respective radially outwardly opening centering depressions defining notches 89 having bottom walls disposed at a selected radius to cooperate in defining the lotus of a circle or such selected diameter of about 4.3 cm.

The hub is formed with a thin bearing wall 100 concentric within the peripheral wall 90 to form therebetween an annulus having a gridwork with radial spokes 102 formed at the annular ends of elliptically shaped lightening holes 104.

Figure 15:
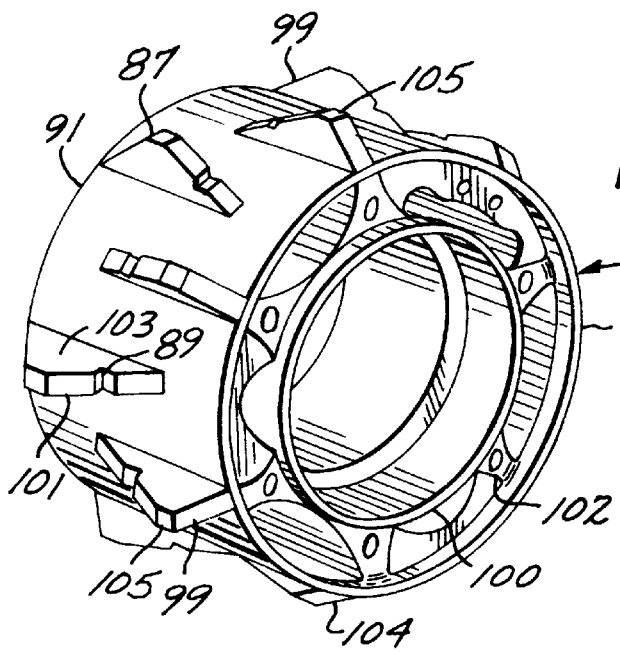
FIG. 15 is a perspective view of a hub which may be incorporated in a third embodiment of the present invention.

As shown in FIG. 15 the stand-off ribs are spaced equidistant about the radially outwardly facing rim in two rows to form a staggered circular pattern staggered to the opposite sides of the axially central plane. The two rows of stand-off ribs are positioned in a mirrored orientation about the centerline of the rim with the ribs of one row centered between the ribs of the other row. In practice the stand-off ribs 103 provide a dove tail configuration having a relatively narrow cross-section at the rim interface and transitioning to a larger cross-section at the distal extent of the rib.

Figure 16:
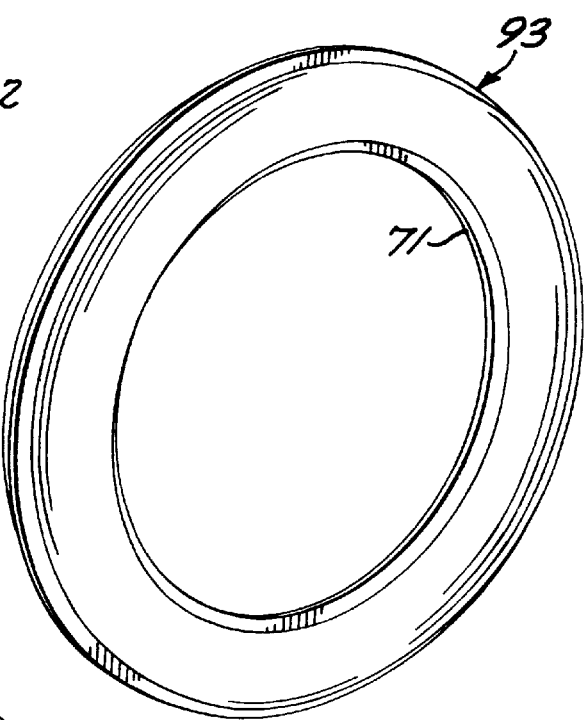
FIG. 16 is a perspective view of a bladder device which may be mounted on the rim shown in FIG. 15.

Referring to FIG. 16, a toroidal pressurized bladder, generally designated 93, having an interior ring defining stand-off skirt 71 sized with a relaxed interior diameter of about 4.2 cm to be drawn elastically into firm contact with the radially interior surface of the stand-off skirt contacts the radially outwardly facing surface of the bottom walls of the respective centering notches 89 to positively space the interior diameter of the bladder outwardly from the radially outwardly facing rim surface to form through pockets through which liquid polyurethane may flow.

Figure 19:
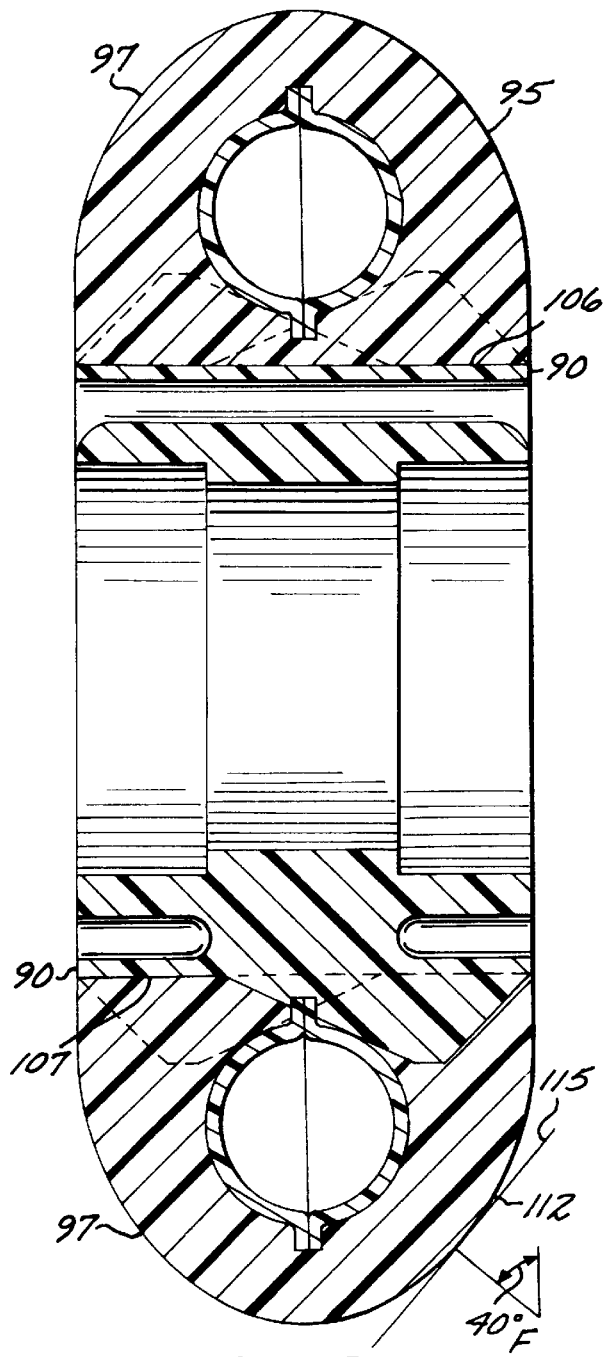
FIG. 19 is a cross-sectional view, similar to FIG. 18, but showing the tire body molded on the hub around the bladder.

Referring to FIG. 19, the tire body is somewhat U-shaped in axial cross section to substantially encapsulate the bladder to be configured with flat radially inwardly facing ends 106 and 107 pressing against and bonded to the rim wall 90 and to form opposite lateral walls extending radially outwardly to form a constant axial body width to project on the axially opposite sides of the bladder to be configured with opposite side walls 95 having respective axial widths of 8 mm to then curve around the radial outer extent of such bladder in semi-cylindrical fashion to form a radial distal tread wall also of a 8 mm width.

Figure 17:
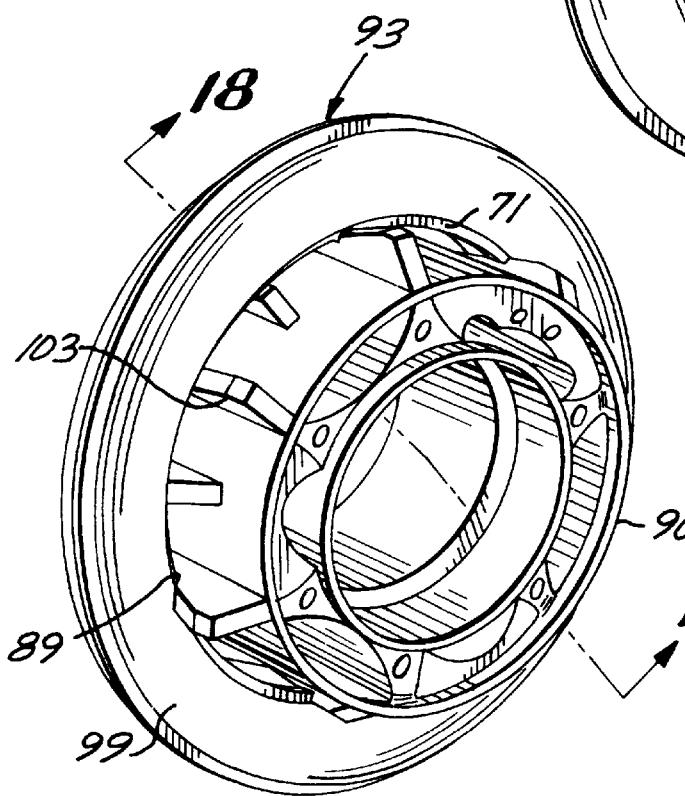
FIG. 17 is a perspective view of the rim of FIG. 15 and bladder of FIG. 16 anchored together.
Figure 18:
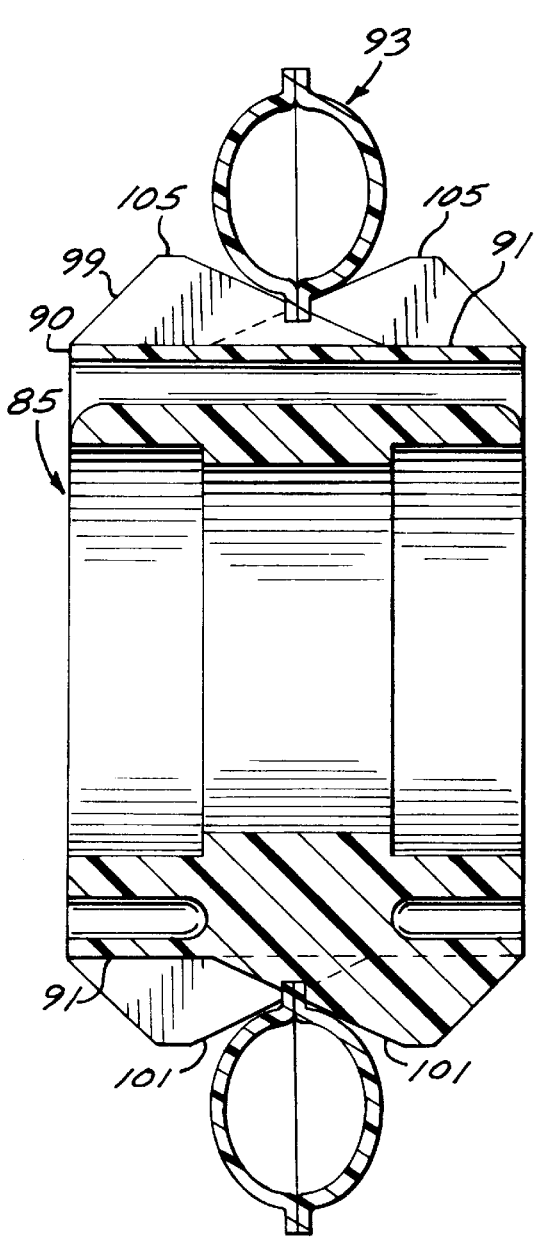
FIG. 18 is an enlarged cross-sectional view taken along line 18—18 of FIG. 17.

In fabrication, the hub may be formed by molding and the bladder prefabricated by heat sealing to form parametrial welds and the stand off skirt 71 and with a self sealing value. The bladder may then be pressurized with air to a pressure of about 10 psi at an ambient temperature of about 75 degrees Fahrenheit to maintain the walls thereof distended to an elliptical cross sectional shape as shown in FIG. 18 leaving the walls firm but depressible to the touch. As shown in FIGS. 17, 18, and 19 the bladder in final assembly may be drawn over the hub from either axial side. The workman may gasp the pre-inflated bladder and nest the edge of the skirt 71 on one diametrical in the notches 89 of three or four respective ribs and then drawing the other diametrical side onto the hub, causing the inner diameter of such skirt to ride radially outwardly on the expander ramps 99 to stretch such skirt enabling such other diametrical side, upon the continued application of the assembly force thereto to slide radially outwardly over such ramps, to pass axially over the respective axial cam 105 surfaces to then engage the radial outer extent of the respective centering surfaces 101. The elasticity of the skirt will then tend to draw such skirt radially inwardly causing the radially and axially inner edge thereof to ride radially and axially inwardly on such centering surfaces to be directed into the respective center notches thus automatically centering such bladder in the axial center of the hub. The inherent elasticity of the stand-off skirt 71 will draw it radially inwardly to firmly nest in the centering notches causing the symmetrically shaped body of such partially inflated bladder to be held in a position symmetrical about the axially centered plane of such hub. The hub and bladder combination may then be placed into a mold, the mold closed, and liquid polyurethane poured into the mold cavity defining the exterior shape of the tread body at a temperature of about 180 degrees Fahrenheit. The liquid polyurethane will flow about the cavity of the mold and around the body of the pressurized bladder to form an axial bridge on the radial interior of such bladder 93 and form a secure bond with the outer surface 91 of the wall 90 and with the surface of the ribs. The exothermic reaction of the liquid polyurethane will heat the air to raise the temperature and expand such air to inflate the constrained bladder further to increase the internal pressure thereof to about 19 psi.

As the increased pressure further inflates the bladder, such pressure will cause the walls thereof to assume a circular cross section as shown in FIG. 19 thus distending the opposite axial side walls outwardly to a true toroidal configuration thus stretching such walls and drawing the skirt 71 even more tightly into the centering notches 89 to hold the bladder even more firmly and securely disposed symmetrically about the central axial plane to resist any asymetircial forces thereof that might have been created by weight and pressure of the liquid thermoset urethane. Enhancing this centering of the bladder is the fact that the fully distended walls, as they assume the cylindrically shaped cross section are brought tangentially into either contact with, or near contact with, the inclined centering surfaces on the opposite sides thereof (FIG. 19). Thus, the bladder and consequent toroidal air core will be maintained centered in the mold cavity so the tire body will be formed essentially concentric thereabout to substantially fully encapsulate such air core in a defined shape within an integral thermoset cushioning body. As the wheel is removed from the mold and allowed to cool, the temperature will likewise drop in the fixed volume bladder allowing such air to contract and reduce the pressure to about, for example, 6 to 7 psi and reduce the distending forces applied to the walls 95 and 97 of the tire body thus reducing the tendency of the pressure in such bladder to resist localized inward deflection of such walls as will be described hereinafter.

It will be appreciated by those skilled in the art of in-line skate tires that various side wall and distal tread cushion thicknesses may be produced by utilizing annular bladders with different cross-sectional diameters. By altering the side wall and distal tread cushion thickness, tire performance characteristics may be tailored to the requirements of specific skating surfaces and skating conditions.

In operation, it will be appreciated that wheels of the construction shown in FIG. 19 may be mounted in line on a skate frame to be positioned one behind another. The wearer, then participating in an active regiment, such as hockey or other active maneuvers, on underlying terrain, such as hardwood floors, concrete, asphalt or the like, may execute highly athletic maneuvers applying substantial forces to the tire. It will be appreciated by those skilled in the art that when, for instance, a sharp turn is being made at high speeds, the skate and consequently the wheels will be laid over on a sharply inclined angle, as for instance 40° to the horizontal, such that the peripheral body of the tire, at for instance 112, may be contacted with a support surface 115 such that the wheels on that skate cooperate in carrying the weight of that portion of the skater applied thereto as well as the high centrifugal forces created by a high speed turn. It will be appreciated that such maneuvers serve to apply high tangential forces to the surface of the tire as resisted by contact with the underlying terrain. With the relatively soft tire body of thermoset polyurethane having a durometer on the order of 80A, and the core pressure afforded by the approximately 7 psi in the core of the bladder 71, the wall will flex radially inwardly toward the center line of the cross section of the bladder to a degree dictated by the forces applied thereto, as well as provide for limited compression of the arcuate periphery of such wall thus cooperating to form a footprint defining the area between the tire surface and underlying terrain surface of some substantial area to increase the frictional resistance that would otherwise be provided thereby resisting skidding and consequent scuffing of the tire wall. This then enhances the safety of operation for the skater and contributes to the long service life of the wheel by minimizing abrasion and scuffing which might otherwise result in early wearing away of the surface of such tire and consequent permanent deformation requiring replacement in order to maintain high performance characteristics.

It will be appreciated that a vector of the force applied to the tire body will be directed radially inwardly against the rim wall 91 to be resisted by that wall. In this regard, the stand off ribs 87 act as reinforcing ribs spaced equidistance about the periphery and extending axially more than half way across the axial extent of such wall 90 to thereby cooperate in affording support for such wall and resisting forces applied thereto during high performance maneuvers.

It will be further appreciated that the dove tail configuration of the respective ribs afford a wedge shape providing a mechanical locking feature which cooperates with the bonding of the tire body to the surface 91 and surface of the ribs 87 to resist separation or disassociation of the tire body from the hub. Additionally, it will be appreciated that during rolling of the loaded wheels, there is a tendency to form a flattened area defining a footprint at the tangential point of contact with the underlying terrain. This then results in the polyurethane of the tire body bunching up slightly forwardly of such imprint to essentially form a slight bulge forward of such footprint as the tire rolls on the underlying surface. The radially projecting ribs 87 serve to somewhat segment the tire body such that the tendency of the polyurethane to bunch up forward of the footprint to thus break up the tendency of such bulge to accumulate as the tire rotates thereby minimizing the tendency of the rolling bulge to resist rolling of the tire and thereby minimizing the energy necessary to maintain forward or rearward rolling of the tire.

From the foregoing, it will be appreciated that the in-line skate wheel of the present invention provides an efficient and convenient means for manufacturing a polyurethane in-line skate wheel that will provide good support and shock absorbing characteristics. The wheel will provide for uniform performance around the periphery thereof and will provide for a long and service free life without concern for deterioration thereof due to loss of air pressure or the like.

What is claimed is:

1. An in-line urethane skate wheel comprising:
   a hard urethane hub formed with a rim surface facing radially outwardly;
   a thin wall polyurethane annular bladder having a wall defining a toroidal chamber disposed concentrically about said rim surface and spaced radially outwardly therefrom;
   stand-off ribs spaced equidistant about said rim surface and configured with radially outwardly disposed abutment surfaces contacting said bladder to cooperate in supporting said bladder in radially spaced relation to said rim surface;
   said ribs being arranged in alternate staggered relationship on opposite axial sides said bladder and formed with respective centering surfaces that angle radially and axially outwardly on the respective opposite axial sides of said bladder; and
   a relatively soft polyurethane tire body substantially encapsulating said bladder and bonded to said rim surface.

2. A wheel as set forth in claim 1 wherein:
said stand-off ribs include radially outwardly opening centering notches for engagement with said bladder.

3. A wheel as set forth in claim 1 wherein:
a polyurethane bond bonding said tire body to said rim, to said stand-off ribs, and to said bladder.

4. A wheel as set forth in claim 1 wherein:
said bladder includes a radially interior, annular, stand-off skirt projecting radially inwardly to contact said rim.

5. A wheel as set forth in claim 1 that includes:
fluid in said bladder.

6. A wheel as set forth in claim 1 that includes:
pressurized fluid in said bladder.

7. A wheel set forth in claim 1 that includes:
fluid under pressure of between 0 to 10 psi in said toroidal chamber.

8. A wheel as set forth in claim 1 wherein:
said bladder includes a pair of ring shaped polyurethane sheets defining side walls and radially internal and external heat sealed weld seams sealing the marginal edges of said sheets together.

9. A wheel as set forth in claim 1 wherein:
said tire body is formed with an annular arch enveloping the radially outer extent of said bladder and configured with a radially outwardly disposed cushion and ring shaped side walls axially spaced apart sitting on said rim.

10. A wheel as set forth in claim 1 wherein:
said bladder is constructed integral with said tire body.

11. A wheel as set forth in claim 1 wherein:
said bladder is formed with a radially interior non-distendable ring.

12. A wheel as set forth in claim 1 wherein:
said bladder is formed with a radially exterior non-distendable ring.

13. A wheel as set forth in claim 1 wherein:
said bladder is circular in axial cross-section.

14. A wheel as set forth in claim 1 wherein:
said ribs are formed with said centering surfaces configured with centering depressions.

15. A wheel as set forth in claim 1 wherein:
said ribs are arranged to include centering surfaces disposed on opposite axial sides of said bladder to hold it axially centered on said hub.

* * * * *